United States Patent [19]

Uchiyama

[11] Patent Number: 5,572,282
[45] Date of Patent: Nov. 5, 1996

[54] FOCUS DETECTING APPARATUS

[75] Inventor: Shigeyuki Uchiyama, Tokyo, Japan

[73] Assignee: Nikon Corporation, Tokyo, Japan

[21] Appl. No.: 517,894

[22] Filed: Aug. 22, 1995

Related U.S. Application Data

[63] Continuation of Ser. No. 400,125, Mar. 6, 1995, abandoned, which is a continuation of Ser. No. 234,633, Apr. 28, 1994, abandoned, which is a continuation of Ser. No. 120,231, Sep. 14, 1993, abandoned, which is a continuation of Ser. No. 7,359, Jan. 21, 1993, abandoned, which is a continuation of Ser. No. 921,374, Jul. 29, 1992, abandoned, which is a continuation of Ser. No. 888,426, May 28, 1992, abandoned, which is a continuation of Ser. No. 661,620, Feb. 28, 1991, abandoned.

[30] Foreign Application Priority Data

Mar. 1, 1990 [JP] Japan .......................... 2-52230

[51] Int. Cl.$^6$ ................................. G03B 13/36
[52] U.S. Cl. ............................ 396/125; 396/111
[58] Field of Search ..................... 354/402, 406, 354/407, 408; 250/201.2, 201.7, 201.8

[56] References Cited

U.S. PATENT DOCUMENTS

| | | | |
|---|---|---|---|
| 4,475,800 | 10/1984 | Kinoshita et al. | 354/406 |
| 4,687,917 | 8/1987 | Kusaka et al. | 250/201 |
| 4,812,869 | 3/1989 | Akashi et al. | 354/408 |
| 4,833,315 | 5/1989 | Horikawa | 250/201 |
| 4,851,657 | 7/1989 | Taniguchi et al. | 250/201 |

FOREIGN PATENT DOCUMENTS 2-135311  5/1990  Japan .

Primary Examiner—W. B. Perkey
Attorney, Agent, or Firm—Shapiro and Shapiro

[57] ABSTRACT

In a focus detecting apparatus, comprising a focus detecting optical system which leads two images created by the light passing through two different points of an objective lens onto a pair of one-dimensional image sensor arrays, a divider for dividing the pair of image sensor arrays into small blocks to take out the image output from each block, a focus detection calculator for shifting, from each other, the image outputs obtained from the pair of image sensor arrays to calculate the relative shift amount of the two images, and a modifier for changing the width of the blocks; a focus detecting apparatus further comprising a decider which decreases the width of the blocks through the modifier when it analyzes the space frequency component of the subject and determines that the subject includes a high-frequency component, or increases the width of the blocks when it determines that the subject includes a low-frequency component.

24 Claims, 12 Drawing Sheets

FOCUS DETECTING APPARATUS

This is a continuation of application Ser. No. 08/400,125 filed Mar. 6, 1995 (now abandoned), which is a continuation of application Ser. No. 08/234,633 filed Apr. 28, 1994, (abandoned), which is a continuation of application Ser. No. 08/120,231 filed Sep. 14, 1993 (abandoned), which is a continuation of application Ser. No. 08/007,359 filed Jan. 21, 1993 (abandoned), which is a continuation of application Ser. No. 07/921,374 filed Jul. 29, 1992 (abandoned), which is a continuation of application Ser. No. 07/888,426 filed May 28, 1992 (abandoned), which is a continuation of application Ser. No. 07/661,620 filed Feb. 28, 1991 (abandoned).

BACKGROUND OF THE INVENTION

1. Field of the Invention

The present invention relates to a focus detecting apparatus used for optical equipment such as a single lens reflex camera.

2. Related Background Art

The phase difference detection method is traditionally known as a focus detecting method in a single lens reflex camera. The method is explained with reference to FIG. 9.

The luminous flux, which enters through a lower domain 21a of an objective lens 21, passes through a visual field mask 31, a field lens 32, an aperture 33a and a re-imaging lens 34 in the order in which they are listed before it forms an image on an upper image sensor array 41a. Similarly, the luminous flux, which enters through an upper domain 21b of the objective lens 21, passes through the visual field mask 31, the field lens 32, an aperture 33b and a re-imaging lens 35 in the order in which they are listed before it forms an image on a lower image sensor array 41b.

In the so-called "before-focus" state where the objective lens 21 forms the sharp image of a subject before an expected focusing surface, the pair of subject images formed on the image sensor arrays 41a and 41b move away from each other. In contrast with this, in the so-called "behind-focus" state wherein the sharp image of a subject is formed behind an expected focus surface, the pair of subject images move closer toward each other. At the time of focusing when the objective lens 21 forms the sharp image of a subject on the expected focus surface, the subject images on the image sensor arrays 41a and 41b show relative coincidence. Therefore, the focus adjusting condition of the objective lens 21, that is, the deviating amount and the deviating direction (hereinafter referred to as "defocus amount DF") in this case can be known by determining the relative positions of the pair of the subject images by converting the pair of the subject images into electrical signals using the image sensor arrays 41a and 41b which perform photoelectric conversion, then subjecting those signals to arithmetic operation executed by a microcomputer not shown in the accompanying drawings.

Next, the procedure of the arithmetic processing by a microcomputer for determining the de-focus amount is discussed.

Each of the pair of the image sensor arrays 41a and 41b consists of a plurality of photoelectric converting devices which provide a plurality of photoelectric conversion output a1 ... an, and b1 ... bn as shown in FIGS. 10A and 10B. Then, each string of data is relatively shifted by a prescribed quantity of data (hereinafter referred to as "shift amount" and shown by a symbol "L") to perform relative arithmetic operation. In this case, relative amount C (L) is computed from the equation below:

$$C(L) = \sum_{i=k}^{r} |a_i - b_j| \quad (1)$$

where $j - i = L$ $$L = -lmax, \ldots, -2, -1, 0, 1, 2, \ldots, lmax$$

A shift amount L is an integral value, and the first term k and last term r may increase or decrease in accordance with the shift amount L. The shift amount L, which produces a relative amount C(L) with a minimal value among the relative amounts C(L) thus obtained, is multiplied by a constant Kf determined by the pitch width of the photoelectric converting devices of the image sensor array 41 and focus detecting optical systems, 31, 32, 33, 34 and 35 shown in FIG. 9. The result is a defocus amount DF.

Relative amounts C(L), however, take discrete values as shown in FIG. 10C. The minimum unit of a detectable defocus amount DF is restricted by the pitch width of the photoelectric converting devices of the image sensor arrays 41a and 41b. Therefore, a method for carrying out close focus detection by performing interpolatory arithmetic operation based on discrete relative amounts C (L) and then calculating a minimal value Cex was disclosed by the present applicant under Japanese patent laid-open application No. 60-37513. This method is used to calculate minimal value Cex according to relative amount C(0) which is a minimal value and relative amounts C(1) and C(−1) on the shift amount L on both sides as shown in FIG. 10D. A shift amount Fm which gives the minimal value Cex and defocus amount DF are determined by $$DF = Kf \times Fm$$

$$Fm = L + DL/E$$

where $$DL = \{C(-1) - C(1)\}/2$$

$$Cex = C(0) - DL$$

$$E = \text{MAX} \{C(1) - C(0), C(-1) - C(0)\} \quad (2)$$

In the equation above, MAX {A, B} shows that A or B, whichever is greater, is selected.

It is necessary to determine whether the defocus amount DF is a reliable value or a value affected by the fluctuation in the relative amount due to noises or other cause. The defocus amount DF is judged to be reliable if the following condition is satisfied:

E>E1 and Cex/E<G1 where E1 and G1 are certain prescribed value.   Condition (1)

E is a value that depends on the contrast of a subject, and the greater the value, the higher the contrast becomes, resulting in higher reliability. Cex/E primarily depends on noise components, and as it becomes closer to 0, the reliability improves. If the defocus amount DF has been judged to be reliable from the computation result of Condition (1), then the objective lens 21 is driven to move to the focusing position in accordance with the defocus amount DF.

In the focus detection method described above, reliable focus detection cannot be achieved unless the subject image formed on the image sensor array 41 has a contrast of a certain level or higher. Generally, in a photographing subject, the horizontal contrast is frequently stronger than vertical contrast. For this reason, a pair of the image sensor arrays 41a and 41b is positioned horizontally against a photographing screen to perform focus detection by the horizontal contrast.

Another method is also known, which permits accurate focus detection for both horizontal and vertical contrasts. In this method, a pair of image sensor arrays 43a and 43b is oriented horizontally, and another pair of image sensor arrays 43c and 43d are oriented vertically as shown in FIG. 11, considering a case where the horizontal contrast is low while the vertical contrast is high, or a case where a camera is positioned vertically.

The optical system in which a pair of image sensor arrays is positioned horizontally and another pair is positioned vertically to perform focus detection as discussed above is shown in FIG. 12A.

A visual field mask 36, a field lens 37, an iris 38, a re-imaging lens 39 and an image sensor array 42 are positioned on the optical axis of an objective lens 22 as illustrated. The visual field mask 36 has a cross-shaped aperture and it is located in the vicinity of the expected focus surface of the objective lens 22 to control the aerial image of a subject formed by the objective lens 22. The iris 38 has four apertures, 38a, 38b, 38c and 38d.

The re-imaging lens 39 consists of four lenses, 39a, 39b, 39c and 39d as shown in FIG. 12B, and it serves to form the image restricted by the visual field mask 36 onto the image sensor array 42. Therefore, the luminous flux entering through a domain 22a of the objective lens 22 goes through the visual field mask 36, the field lens 37, the aperture 38a of the iris 38 and the lens 39a of the re-imaging lens 39 in the order in which they are listed before it forms the image on the image sensor array 42a. Similarly, the luminous fluxes entering through domains 22b, 22c and 22d of the objective lens 22 form images on image sensor arrays 42b, 42c and 42d. The subject images formed on the image sensor arrays 42a 4 and 42b move apart from each other if the objective lens 22 is in the before-focus condition, or move closer toward each other in the behind-focus condition. The images are arranged with a certain distance when focusing is achieved. Therefore, the focus adjusting condition of the objective lens 22 in the horizontal direction can be detected by subjecting the signals from the image sensor arrays 42a and 42b to the arithmetic operation executed by a microcomputer. Similarly, the individual subject images formed on image sensor arrays 42c and 42d move farther apart from each other when objective lens 22 is in the before-focus condition, while they move closer to each other in the behind-focus, and they are positioned with a certain distance between them when focusing is accomplished. Thus, the focusing adjusting condition of the objective lens 22 in the vertical direction can be detected by subjecting the signals from the image sensor arrays 42c and 42d to the arithmetic operation.

Some of the known methods for deciding whether the detection result from the horizontal focus adjusting condition or that from the vertical focus adjusting condition should be used to drive the lenses include:

(1) One in which the detection result with higher reliability is selected. (For instance, the result in which the value of E mentioned above is larger), (2) One in which the priority is given to one direction (vertical direction, for example), and if no reliable result is obtained or if no minimal value C(0) mentioned above exists, making arithmetic operation impossible, then focus detection in the other direction (vertical direction) is performed, and (3) One in which the mean value of the computing results from both directions is taken.

In such focus detecting apparatus, when the images of a plurality of subjects with different distances are formed on image sensor arrays, there are possibilities of making misjudgment on proper focusing as a result of adopting the average distance of those subjects or of focus detection being made impossible. To solve the problem, a camera has been proposed, which is designed to perform focus adjustment in a way that a subject image is subdivided by dividing a pair of image sensor arrays into a plurality of blocks, and the arithmetic operation for focus detection is executed on each of such blocks. From the arithmetic operation results obtained, a block which includes, for example, a subject existing at the closest point or a subject with the strongest contrast is found, and focus adjustment is performed in accordance with the computation result of the block. (Refer, for instance, to U.S. Pat. Nos. 4,687,917 and 4,851,657.)

In the present invention, to divide the image sensor arrays into a plurality of blocks, for instance, a fixed number of the first term k and last term r in the shift amount L=0 is equation (1) described above is provided. For example, as shown in FIG. 13A, to divide the image sensor array into 6 blocks, the relative amounts C(L) at block 1 are calculated using the equation (1) with k=1 and r=6 when the shift amount L=0, then the defocus amount DF is calculated using equation (2) according to the calculation results of equation (1). Similarly, at blocks 2, 3, 4, 5 and 6, setting is made to provide (k=7, r=12), (k=13, r=18), (k=19, r=24), (k=25, r=30), and (k=31, r=36) when the shift amount L=0, then the defocus amount DF is calculated using the equations (1) and (2). In FIG. 13B, there are 3 blocks, the width of each block being greater than that shown in FIG. 13A.

SUMMARY OF THE INVENTION

In the above-mentioned method, however, a pair of image sensors arrays is divided into a plurality of blocks to perform the arithmetic operation for focus detection on each block. This presents the following problem:

The space frequency component of a subject which has a strong contrast and sharp edges includes high-frequency components, while a subject which is flat as a whole with a weak contrast has only low-frequency components. For this reason, the computation method involving the division into small blocks described above can ensure no reliable computation result on any block for a subject like the latter type.

The reason is discussed in detail, referring to FIGS. 14A, 14B, 15A and 15B. FIGS. 14A and 14B show the image outputs of image sensor array 40 in the case of a subject with strong contrast and sharp edges.

Now, the strings of data on a pair of image sensor arrays are denoted as A (shown in solid line in the figure) and B (shown in dotted line in the figure). FIG. 14A shows the coincidence between data strings A and B when shift amount L=0. FIG. 14B shows string B which has been shifted one pitch to the right (it is assumed that the shifting 10 direction is "+"). Relative amount C(L) decreases to the minimum when the data of strings A and B agrees, which is shown in FIG. 14A. In this case, C(0) in equation (2) previously mentioned becomes 0. Relative amount C(1) means the difference produced when one of the data strings is shifted one pitch, therefore, it corresponds to the area of the hatched part in FIG. 14B. Also, data strings A and B show perfect coincidence at shift amount L=0, therefore, relative amount C(−1) becomes equivalent to C(1) when shift amount L=−1. Thus, C(1) C(0)−C(−1)−C(0) is obtained, and E=C(1)−C(0)=C(1) according to equation (2). In other words, the area of the hatched part shown in FIG. 14B corresponds to E.

A narrow block N and a wide block W shown in FIG. 14B are discussed. In this case, both block N and block W are covered by the hatched part, and therefore, the value of E will be the same whether the equations (1) and (2) are applied to the block N or the block W. This means that a defocus amount can be obtained with an identical accuracy whether the block N or the block W is used, so that no problem is presented no matter how the subject is subdivided into blocks.

The similar discussion is given to FIGS. 15A and 15B. The subject pattern in this case does not have a sharp edge shown in FIGS. 14A and 14B, and it is flat as a whole, presenting a low-frequency pattern. FIG. 15A shows the coincidence of data of the string A (shown with solid lines in the figures) and the string B (shown with dotted lines in the figures) described above. FIG. 15B shows the data of the string B, which has been shifted one pitch to the right. Just like the case in FIG. 14B, the area of the hatch part shown in FIG. 15B becomes the value of E, however, it differs from the case of FIG. 14B in that the area of the hatched part included in the block W is larger than that included in the block N. Thus the value of E is larger for the block W, which means that the block W enables the defocus amount to be calculated with a higher accuracy. If the block width is reduced, the area of the hatched part included in the block decreases accordingly, and the value of E becomes smaller until finally the value of E goes down below E1 which is the threshold value of E in Condition (1) previously mentioned. As a result, focus detection becomes impossible.

Thus, it is desirable to provide a larger focus detection domain for a subject which has only low-frequency components. This is because a new wider block can be formed to carry out calculation again if no reliable calculation result is obtained from any of the small blocks. This, however, would add to the time required for arithmetic operation, adversely affecting the efficiency.

The object of the present invention is to improve the focus detection accuracy by dividing an image sensor into blocks of an optimum size for the space frequency component of a subject.

The configuration of the present invention designed to fulfill the object mentioned above is discussed below:

The present invention is explained, referring to FIG. 1 which shows an embodiment. The present invention relates to a focus detecting apparatus consisting of a focus detecting optical system 30 which guides two images formed by light passing through two different parts of a lens 20 onto a pair of image sensor arrays 40, a dividing means 53 which divides a pair of image sensor arrays 40 into small blocks to take an image output from each block, a focus detecting calculating means 54 which shifts the image outputs, from each other, that are received from the pair of the image sensor arrays 40 to calculate the relative shift amount of the two images, and a modifying means 52 which changes the width of such blocks. The apparatus fulfills the above-mentioned object by a deciding means 51 which is designed to decrease the width of the blocks using the modifying means 52 when it analyzes the space frequency component of a subject and determines that it includes high-frequency components, and to increase the block width when it determines that the space frequency component of the subject contains only low-frequency components.

DESCRIPTION OF THE PREFERRED EMBODIMENTS

Figure 1:
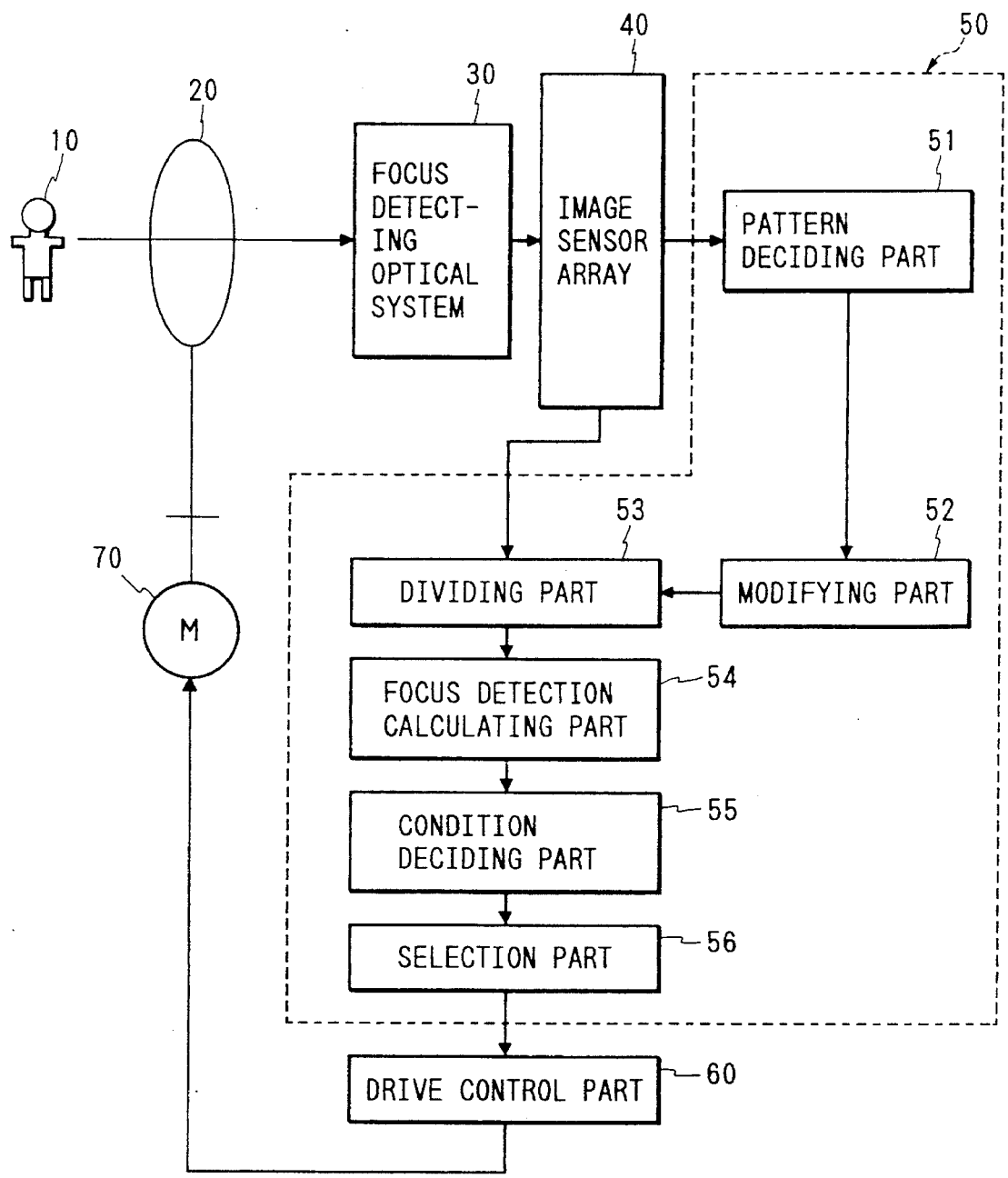
FIG. 1 is a configuration diagram which shows a preferred embodiment of the present invention.
Figure 9:
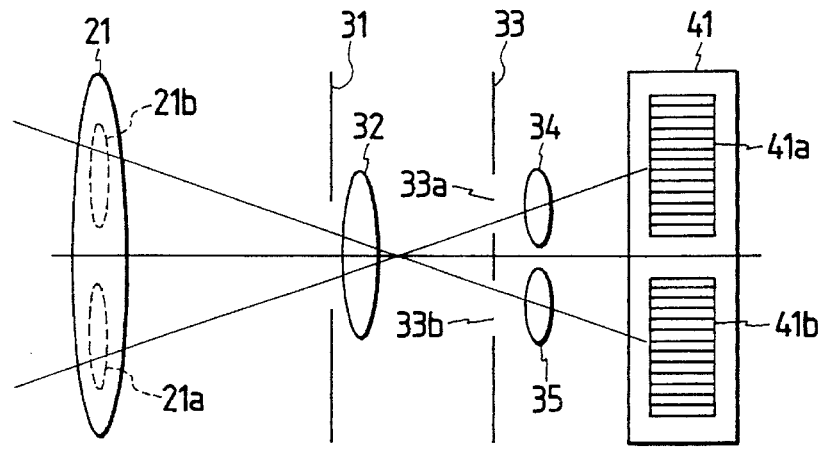
FIG. 9 illustrates the focus detecting optical system for performing focus detection in one direction.
Figure 11:
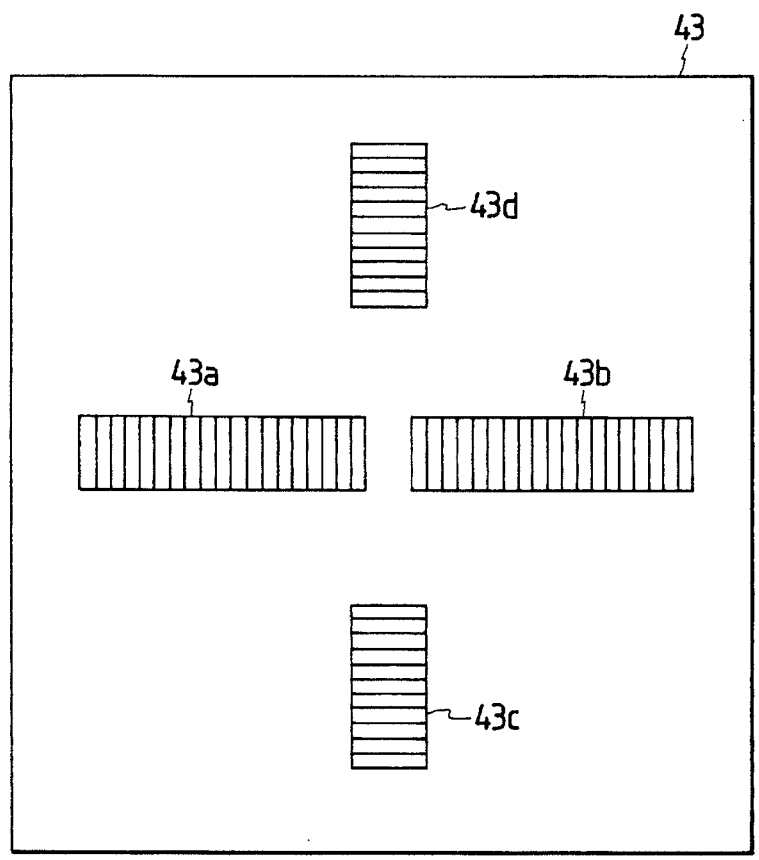
FIG. 11 shows an example of the image sensor array related to the present invention.
Figure 10A:
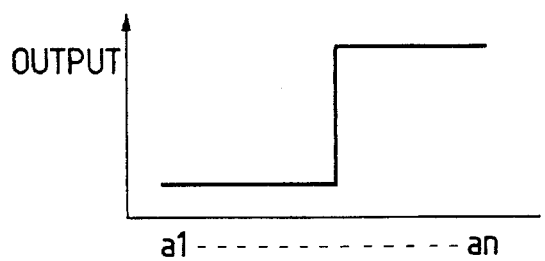
FIGS. 10A through 10D illustrate the calculation of the relative amount C(L)
Figure 10B:
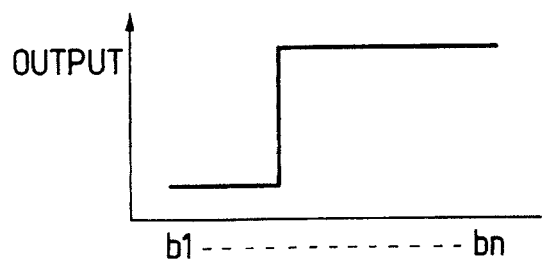
Figure 10C:
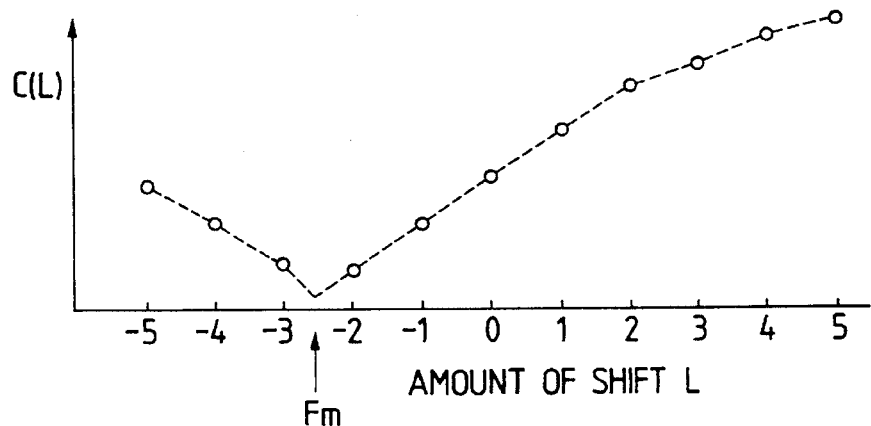
Figure 10D:
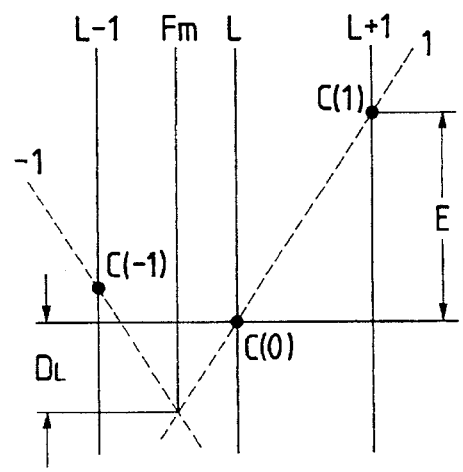
Figure 12A:
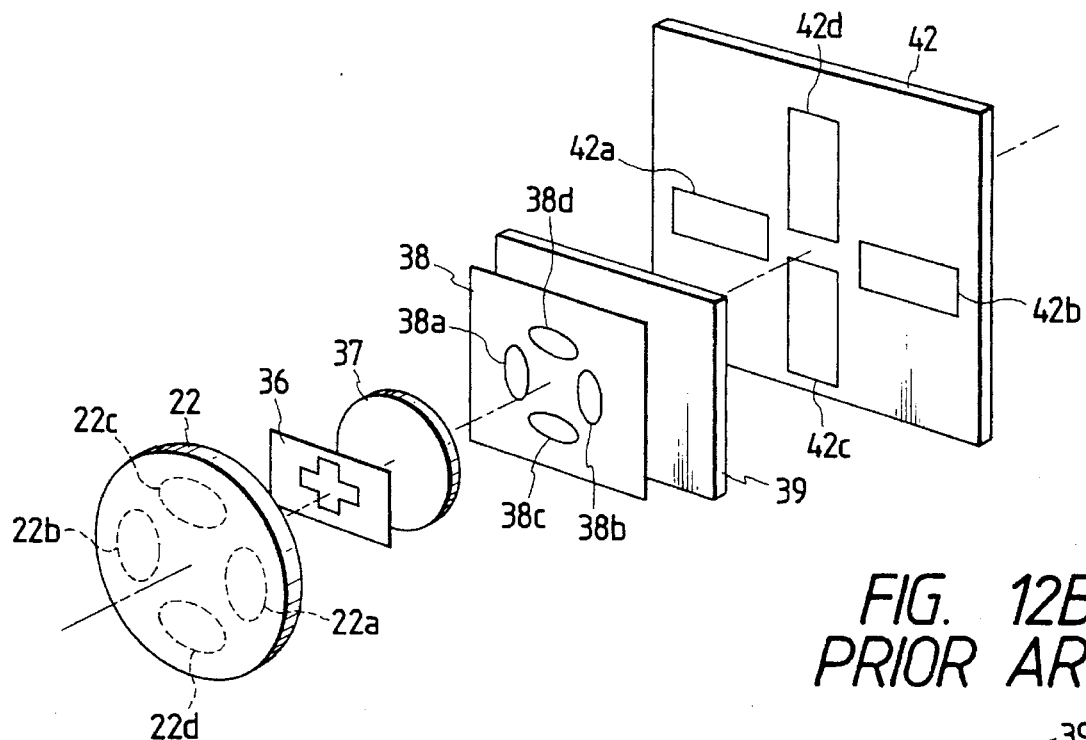
FIG. 12A shows the focus detecting optical system for performing focus detection in a plurality of directions.
Figure 12B:
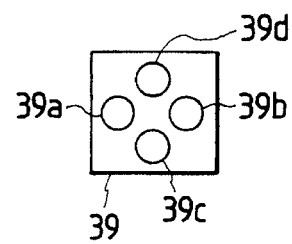
FIG. 12B shows the configuration of the re-imaging lens shown in FIG. 12A, FIGS. 14A, 14B, 15A and 15B illustrate the relationship between subject patterns and block widths, FIGS. 14A and 14B relating to a subject with a strong contrast, and FIGS. 15A and 15B relating to a subject which is flat as a whole with a weak contrast.

FIG. 1 shows the configuration of a preferred embodiment of the present invention. 10 represents a subject, 20 represents an objective lens, and 30 denotes a focus detecting optical system shown, for instance, in FIG. 9 or FIGS. 12A and 12B. The optical system consists of a visual field mask, field lens, aperture and re-imaging lens. 40 is a pair of image sensors array shown in FIG. 9 or a pair of image sensor arrays arranged in a plurality of directions as shown in FIG. 11, and 50 is a control circuit which includes a microcomputer for implementing various types of calculation and controlling a camera.

FIG. 1 shows devices 51 through 56 of a microcomputer for executing various types of arithmetic operation. The following provides the detailed description of each of the devices 51 through 56.

The pattern identifier 51 detects the frequency components included in the image pattern of a subject in accordance with the image output received from the image sensor array 40, and decides the width of the blocks for dividing the image sensor array 40. Specifically, the pattern identifier subjects the output data from the image sensor array 40 to the calculation for the filtering with the space frequency band-pass characteristic. The filtering operation is implemented on the output from one of the image sensor arrays 40 which forms a pair. If the data before filtering is taken as "da," and filtered data as "F," then the data can be determined by the following equation:

$$F(i) = -da(i) + 2 \times da(i+2) - da(i+4) + 128 \quad (3)$$

where $i = 1, 2, 3, 4, 5, \ldots$

Figure 2:
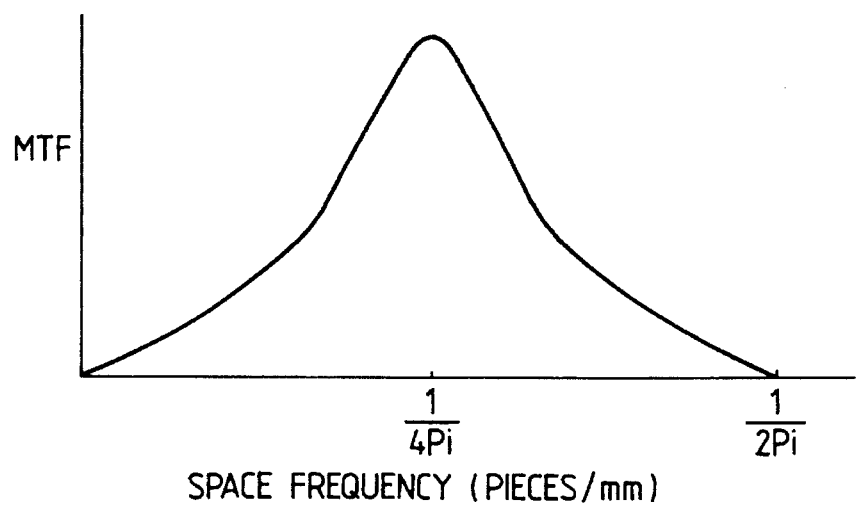
FIG. 2 shows the MTF characteristics obtain from the filtering operation.

MTF (Modulation Transfer Function) involved in the filtering operation is shown in FIG. 2.

Figure 3A:
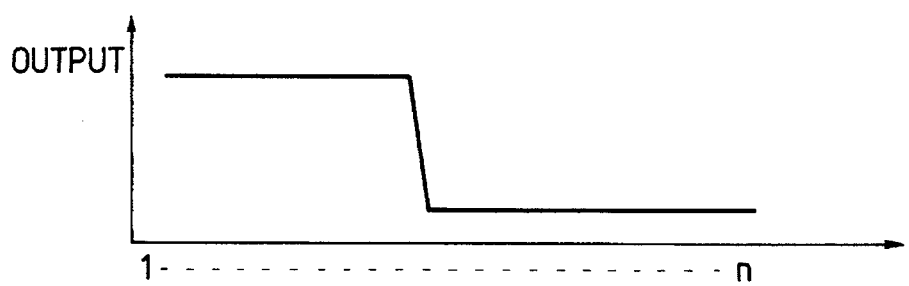
FIGS. 3A, 3B, 4A and 4B illustrate the results of the filtering operation, FIGS. 3A and 3B showing the results on a subject with a strong contrast and FIGS. 4A and 4B showing the results on a subject which is flat as a whole with a weak contrast.
Figure 3B:
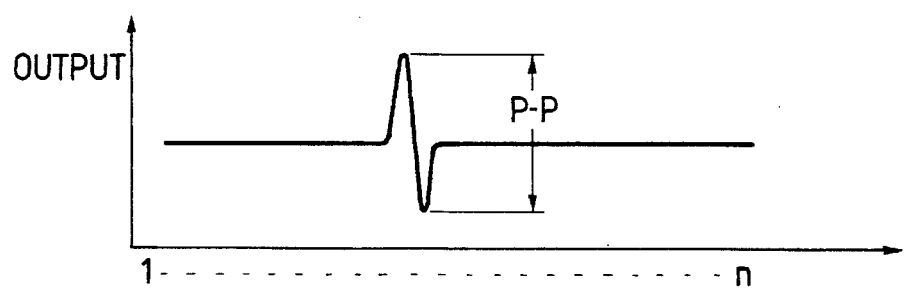
Figure 4A:
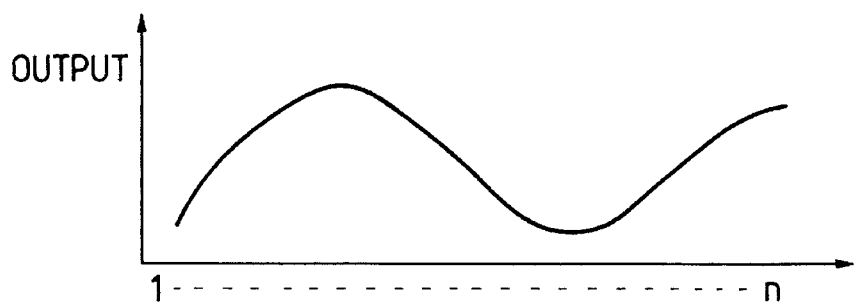
Figure 4B:
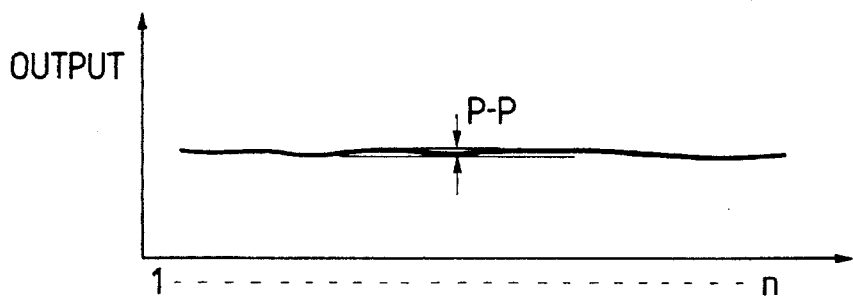

When the pixel pitch of the image sensor array 40 is taken as "Pi," MTF with (1/4Pi) pixels/mm as its peak is obtained. If pitch Pi=100 μm, for example, 2.5 pixels per millimeter is the peak. When such filtering operation is carried out on the image pattern which includes a high-frequency components shown in FIG. 3A, the data with the contrast shown in FIG. 3B results. On the other hand, when an image pattern which includes only low-frequency components shown in FIG. 4A is subjected to the filtering operation, no contrast appears as seen from FIG. 4B. Hence, if the difference between the maximum and minimum values (hereinafer abbreviated as "P–P" value) of the filtered data string F is above a certain level, the subject is determined to include sufficiently high frequency components. On the contrary, if the difference is below the certain level, the subject is determined to comprise only low-frequency components.

The modifier 52 controls the divider 53 to change the width of blocks for dividing the image sensor arrays 40 according to the result given by the pattern identifier 51. The divider 53 divides a pair of the image sensor arrays 40 into small blocks, and sends out each image output, a1 . . . an, b1 . . . bn, for each block. The focus detection calculator 54 carries out the processings such as relative calculation and interpolatory calculation previously mentioned for calculating the defocus amount DF for each image output taken out from each block. The decider 55 decides whether the defocus amounts DF calculated by the focus detection calculator 54 satisfy the aforementioned Condition (1) or not. From the defocus amounts DF judged to meet Condition (1) by the decider 55, the selector 56 selects one that meets the specified conditions. The functions of those devices 51 through 56 are achieved by the program-based processing of the microcomputer.

A drive controller 60 drives a driving motor 70 in accordance with the defocus amount DF selected by the selector 56.

Figure 5A:
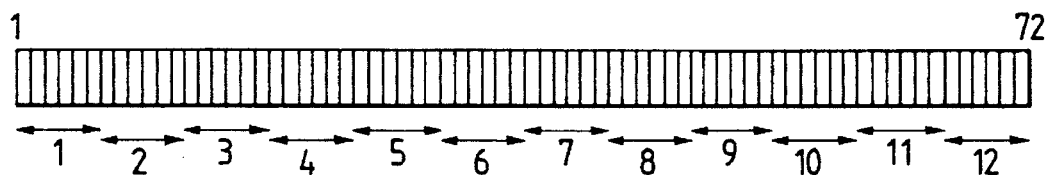
FIGS. 5A, 5B, 13A and 13B illustrate how the block division is implemented, FIG. 5A showing a case wherein 72 pixels are divided into 12 blocks, FIG. 5B showing a case wherein the 72 pixels are divided into 6, FIG. 13A showing a case wherein 36 pixels are divided into 6 blocks, and FIG. 13B showing a case wherein the 36 pixels are divided into 3 blocks, FIG. 6 provides a flowchart of the horizontal focus detecting procedure, FIG. 7 provides a flowchart of the focus detecting procedure in both horizontal and vertical directions, FIGS. 8A and 8B provide flowcharts of another procedure for performing the bi-directional focus detection.
Figure 5B:
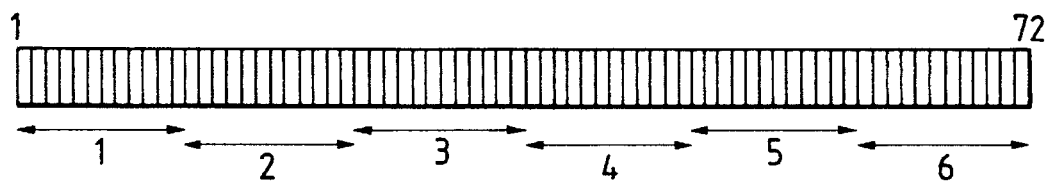

The series of operations of the focus detecting apparatus consisting of the devices described above are explained with reference to the flowchart of FIG. 6. In the description set forth below, the focus detecting optical system 30 and the image sensor arrays 40 are considered to have the configuration shown in FIG. 9, for example, and to conduct horizontal focus detection. Also, each of the pair of the image sensor arrays 41a and 41b is assumed to be comprised of 72 pixels. The output is assumed to be divided into 12 sets of narrow block consisting of 6 pixels as shown in FIG. 5A or into 6 sets of wide block consisting of 12 pixels as shown in FIG. 5B.

Figure 6:
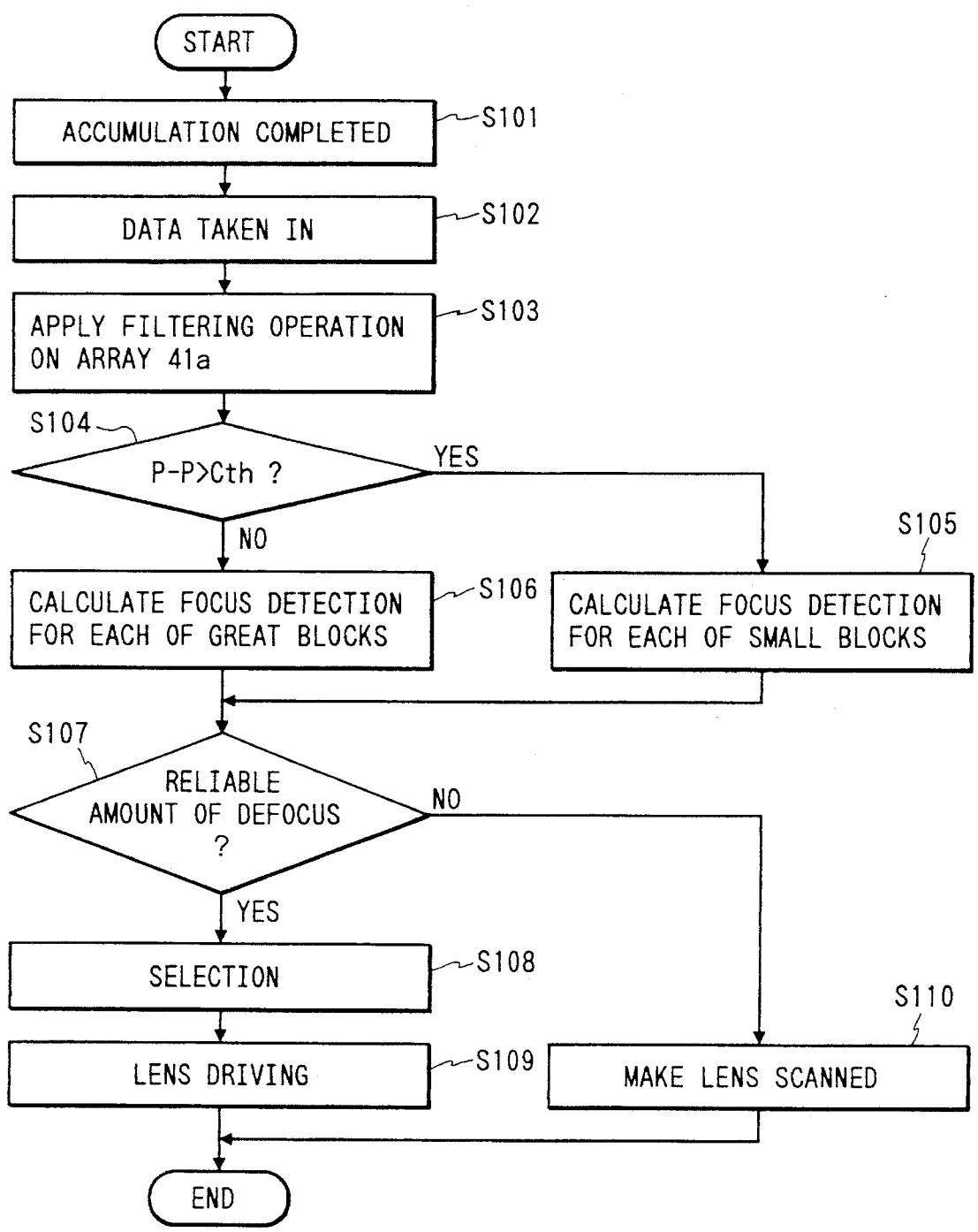

FIG. 6 presents the flowchart which shows the series of focus detecting operations of the focus detecting apparatus discussed above.

In a step S101, if the accumulation of the image data of the image sensor arrays 41 has been completed, then the system proceeds to a step S102. The microcomputer 50 takes in each pixel output, and proceeds to a step S103. In the step 103, the pattern identifier 51 implements the aforementioned filtering operation on the output of one image sensor array 41a shown in FIG. 9. In a step S104, the system decides if the P–P value is greater than the specified value Cth or not. If it is greater, then the system determines that the subject includes a sufficiently high frequency component, and proceeds to a step S105 wherein the divider 53 devides, under the control of the modifier 52, the outputs of the image sensor arrays 41a and 41b into narrow small blocks. The focus detection calculator 54 executes the aforementioned focus detection calculation on the output of each small block to determine a plurality of defocus amounts DF. If P–P≦Cth, then the system decides that the subject consists of a pattern which includes only low-frequency components, and proceeds to a step S106. Under the control of the modifier 52, the divider 53 divides the output of each of the image sensor arrays 41a and 41b into wide blocks. The calculator 54 performs focus detecting calculation for each wide block to determine a plurality of defocus amounts DF.

Next, in a step S107, the system decides whether or not there is a reliable one among the calculated defocus amounts DF. If the system finds reliable ones, it proceeds to a step S108, and if it does not, then it proceeds to a step 110. The step 107 involves the decider 55. In the step S108, among the defocus amounts DF that have been determined to be reliable, one that satisfies the condition (i.e. the defocus amount that shows the closest point) is selected. The step S108 involves the selector 56. In a step S109, the drive controller 60 controls the motor 70 so that the objective lens 20 is driven only by the defocus amount DF selected by the selector 56. If no reliable defocus amount DF is found in the step S107, then the drive controller 60 causes the objective lens 20 to carry out scanning in the step S110. This is conducted to drive the objective lens 20 to the closest photographing position then to move it in the opposite direction toward the infinite distant photographing position in order to locate a lens position which gives a reliable defocus amount DF.

Alternatively, the system may be programmed so that, if the system finds that the P–P value exceeds the specified value in the step S104 and proceeds to the step S105 where it finds no reliable defocus amount as a result of the focus detecting calculation on the small blocks, the system switches to the larger block mode to rerun the focus detecting calculation.

The description set forth below refers to a case where the focus detecting optical system 30 and the image sensor arrays 40 have the configuration shown in FIGS. 12A and 12B. In other words, it refers to the detection in the two directions, horizontal and vertical.

Figure 13A:
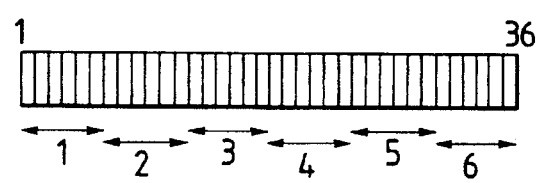
Figure 13B:
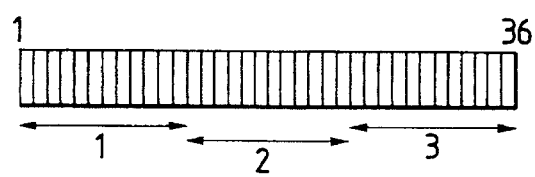
Figure 14A:
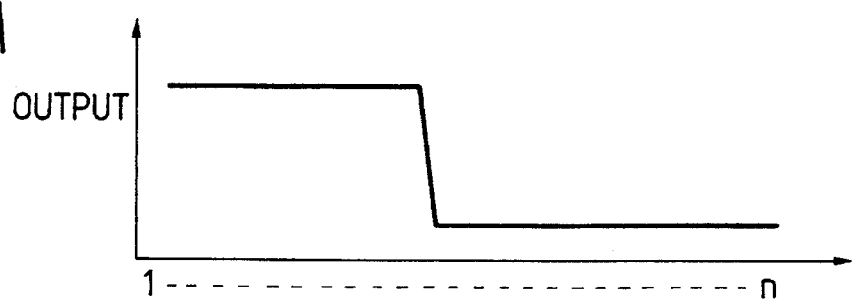
Figure 14B:
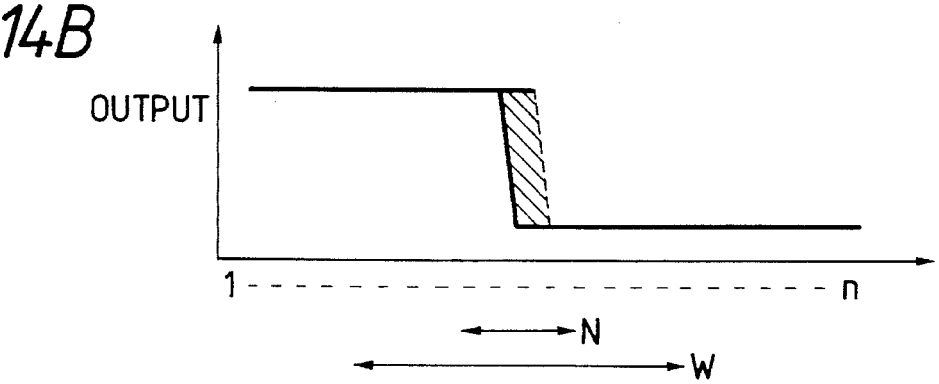
Figure 15A:
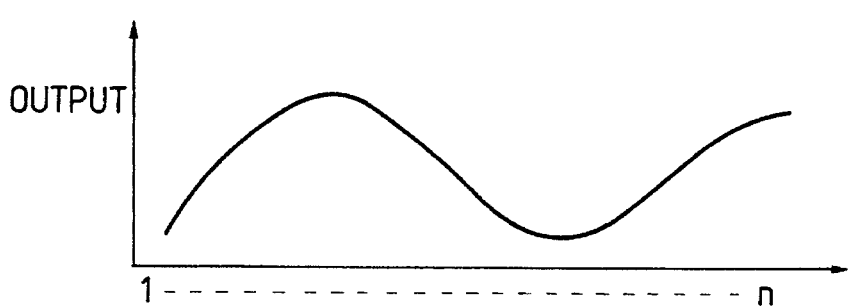
Figure 15B:
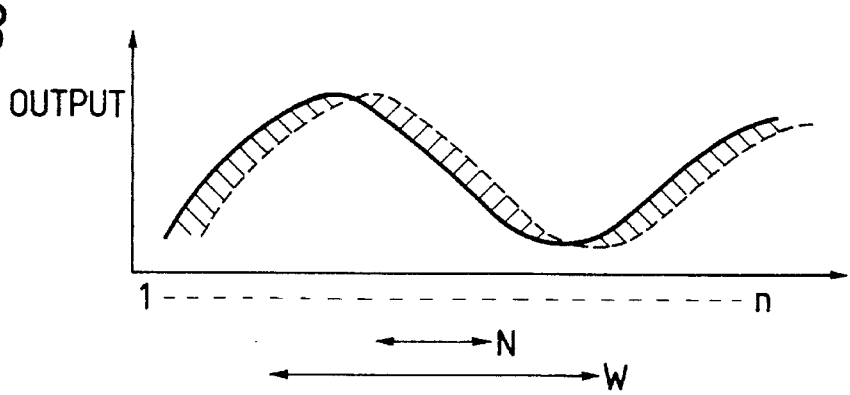

Each of the image sensor arrays 42a and 42b which form a pair to perform horizontal focus detection consists of 72 pixels as shown in FIGS. 5A and 5B. As previously described, 12 sets of narrow blocks, each comprising 6 pixels shown in FIG. 5A or 6 sets of wide blocks, each comprising 12 pixels, are formed to implement the focus detecting calculation. Also, each of the image sensor arrays 42c and 42d which form a pair consists of 36 pixels as shown in FIGS. 13A and 13B. As shown in FIG. 13A, selection is made between the small-block mode wherein six sets of 6-pixel narrow blocks are used as shown in FIG. 13A, and the large-block mode wherein three sets of 12-pixel wide blocks are used as shown in FIG. 13B.

Figure 7:
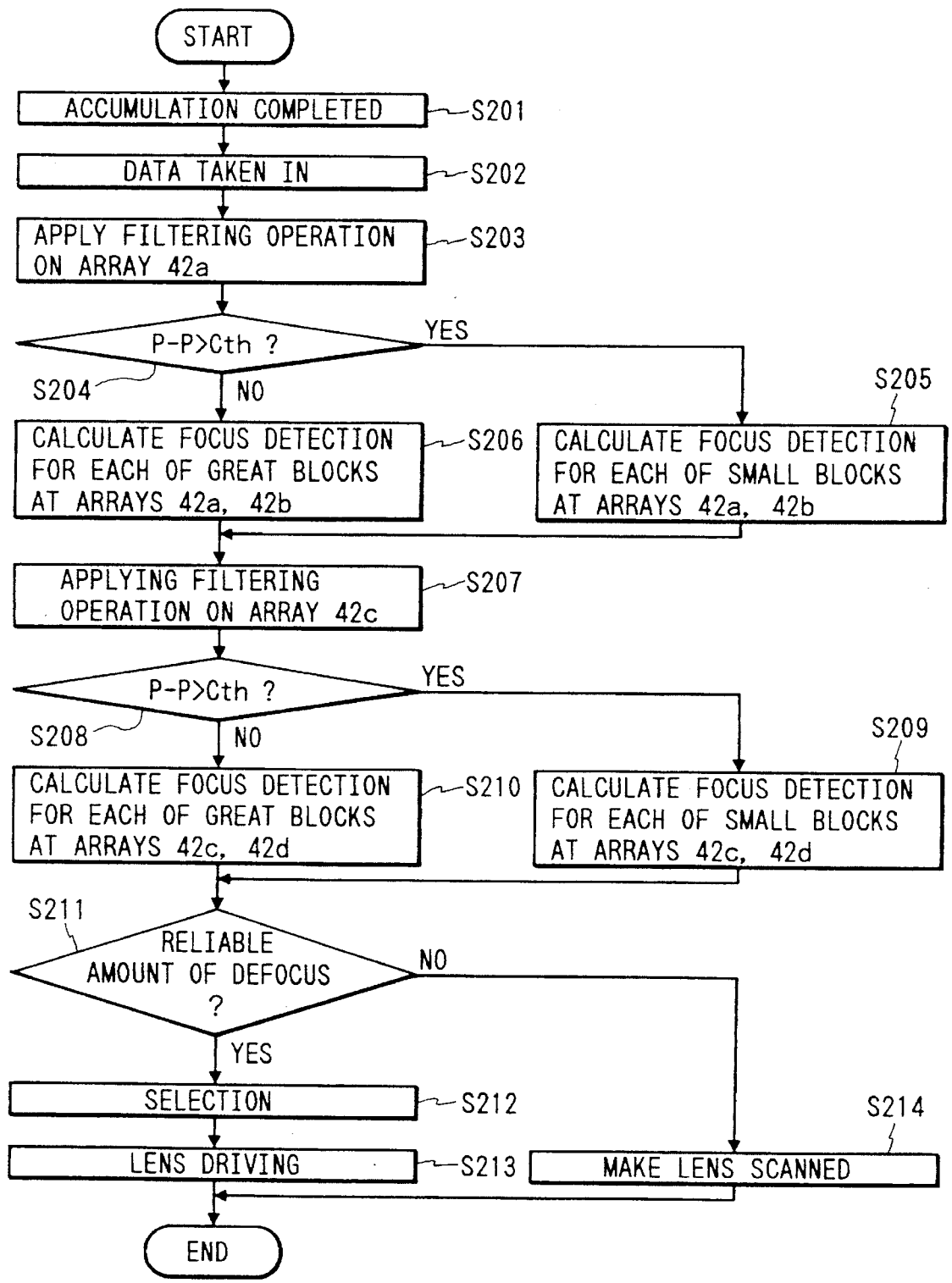

The focus detecting operation given by the configuration explained above is discussed, referring to the flowchart of FIG. 7.

When the accumulation of the image data from the image sensor arrays 42 is completed in a step S201, the individual pixel outputs are taken in during a step S202, and the pattern identifier 51 performs the filtering operation on the array 42a of the horizontal pair of image sensor arrays as previously described in a step S203. In a step S204, the system decides whether the aforementioned P–P value is greater than the specified value, Cth, or not, and if it decides that it is greater, then it assumes that the subject contains a sufficiently high frequency component and advances to a step S205 where the system carries out the focus detecting calculation in the narrow, small-block mode in the same procedure as that discussed previously. If the P–P value is lower than the specified value, then the system determines that the subject comprises only low-frequency components and executes the focus detecting calculation in the wide, large-block mode in a step S206.

The system then proceeds to a step S207 where the pattern identifier 51 conducts the filtering operation on the array 42c of the vertical pair of image sensor arrays. In a step S208, the system determines if the aforementioned P–P value is greater than the specified value, Cth, or not, and if it concludes that it is greater, then it proceeds to a step S209 where it performs the focus detecting calculation in the narrow, small-block mode, assuming that the subject contains sufficiently high frequency components. If the P–P value is lower than the specified value, then the system advances to a step S210 to perform the focus detecting calculation in the wide, large-block made, assuming that the subject comprises only low-frequency components.

In the next step S211, the decider 55 decides whether there are reliable data among the horizontal and vertical defocus amounts DF calculated in the previous step, and if it finds any reliable defocus amounts, the system proceeds to a step S212 where the selector 56 picks up one that meets the condition (e.g. a defocus amount that shows the closest point). In a step S213, the drive controller 60 controls the motor 70 to drive the objective lens 20 by the defocus amount DF which the selector 56 has selected.

If no reliable defocus amount DF is found in the step S211, then the system proceeds to a step S214 where the drive controller 60 causes the objective lens 20 to conduct scanning in the same manner as previously described in order to locate a lens position where a reliable defocus amount DF is obtained.

Alternatively, the system may be programmed so that, if the system finds that the P–P value exceeds the specified value in the step S204 or the step S208 and proceeds to the step S205 or the step S209 where it finds no reliable defocus amount as a result of the focus detecting calculation on the small blocks, the system switches to the larger block mode to rerun the calculation for that direction.

Figure 8A:
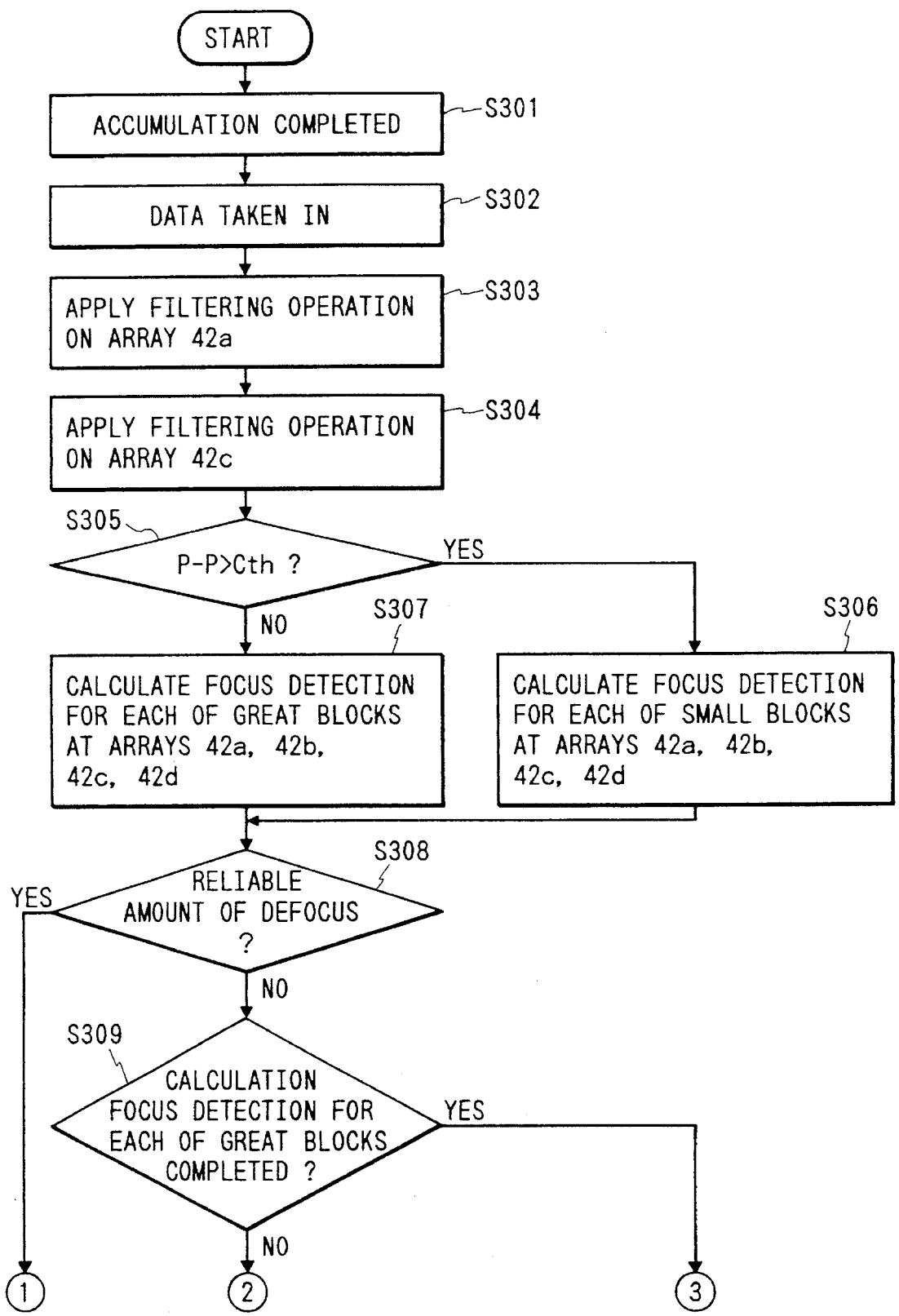
Figure 8B:
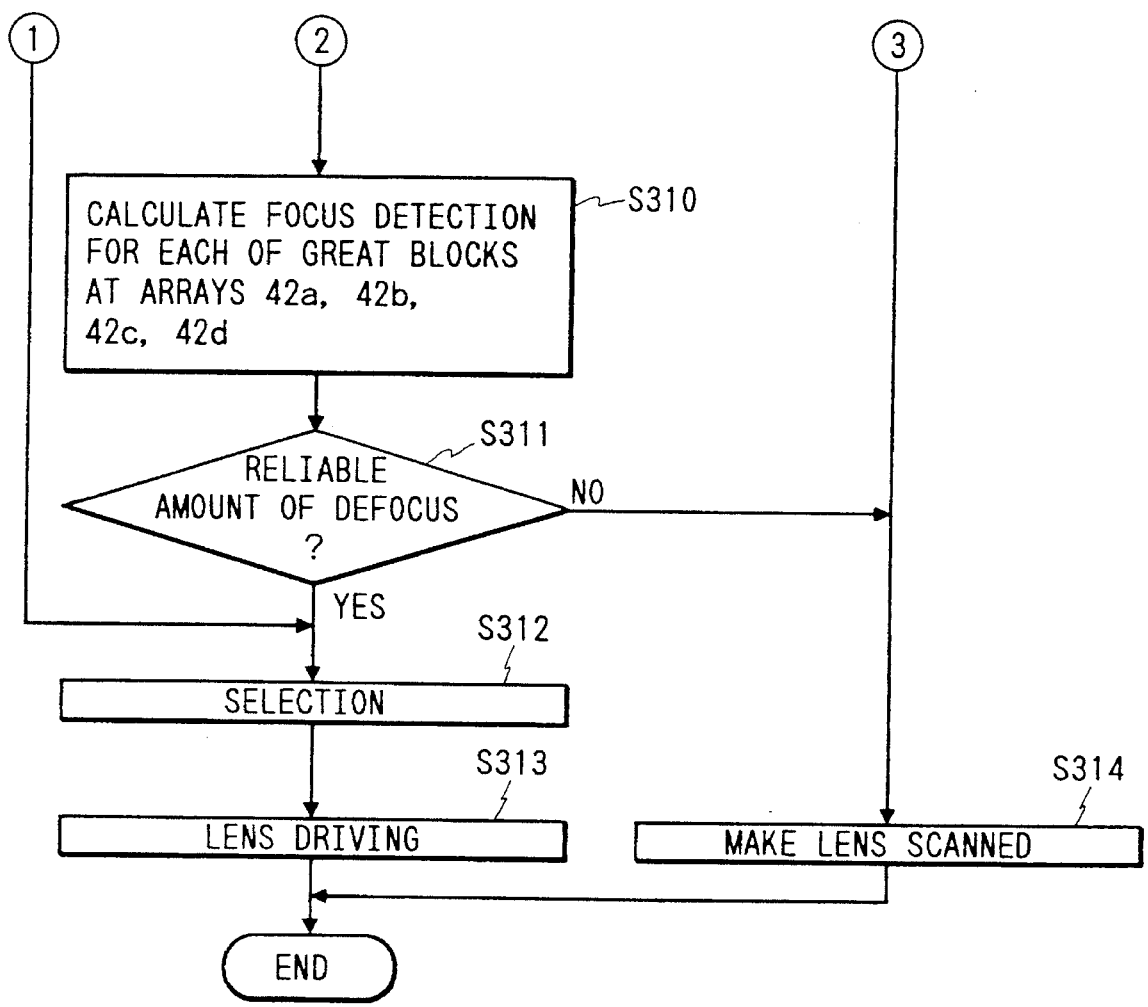

According to the focus detection shown by the flowchart of FIG. 7 described above, there may be a case where the block mode applied to the horizontal direction differs from that applied to the vertical direction. The system, however, may be programmed to apply the same block mode to the two directions. This is explained, referring to the flowcharts in FIGS. 8A and 8B.

After completing the accumulation of the image data at the image sensor arrays 42 in a step S301, the system takes in the outputs of the individual pixels in a step S302, then the pattern identifier 51 conducts at a step S303 the filtering operation on the array 42a of the horizontal pair of the image sensor arrays and the array 42c of the vertical pair of the image sensor arrays as previously described. In a step S305, the system determines whether at least one of the P–P values in the horizontal and vertical directions is greater than the specified value, Cth, or not. If one of the two directions presents a P–P value which is greater than the specified value, then the system goes to the subsequent step S306 to perform the focus detecting calculation on both horizontal and vertical directions in the narrow, small-block mode. If the P–P value in either direction is below the specified value, then the system goes to a step S307 to conduct the focus detecting calculation in both horizontal and vertical directions in the wide, large-block mode. In a step S308, the decider 55 determines whether reliable defocus amounts DF exist or not. If reliable defocus amounts exist, then the system proceeds to a step S312 where the selector 56 selects, among a plurality of defocus amounts DF, one that satisfies the requirement (e.g. the defocus amount that shows the closest point). The system then goes to a step S313 where the drive controller 60 controls the motor 70 to drive the objective lens 20 only by the defocus amount DF selected by the selector 56.

If the system concludes that there is no reliable defocus amount DF in the step S308, then the system proceeds to a step S309 to check whether the large-block calculation has been executed or not. If such large-block calculation has not been executed yet, then the system performs the focus detecting calculation in both horizontal and vertical directions in the wide, large-block mode during a step S310. The system then advances to a step S311, and if it cannot obtain any reliable defocus amount DF or if it finds that the large-block calculation has already been conducted in the step S309, the system causes the objective lens 20 to scan in a step S314 to locate a lens position where a reliable defocus amount DF can be obtained.

If a reliable defocus amount DF is obtained in the step S311, then the objective lens 20 is driven in accordance with the defocus amount DF which has been selected in the same manner as that described in the step S312 and step S313.

Figure 16A:
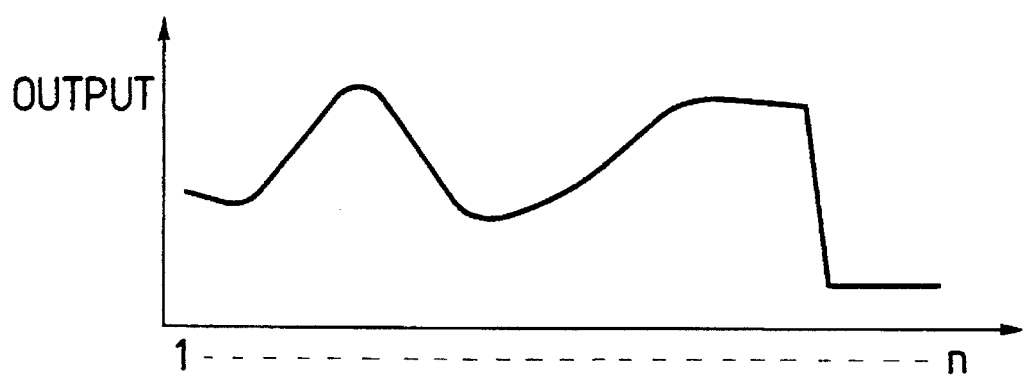
FIGS. 16A and 16B illustrate the results of filtering operation, FIG. 16A showing the case of a subject which consists of a mixture of a subject with a strong contrast and one with a weak contrast, and FIG. 16B showing the results of the filtering operation.
Figure 16B:
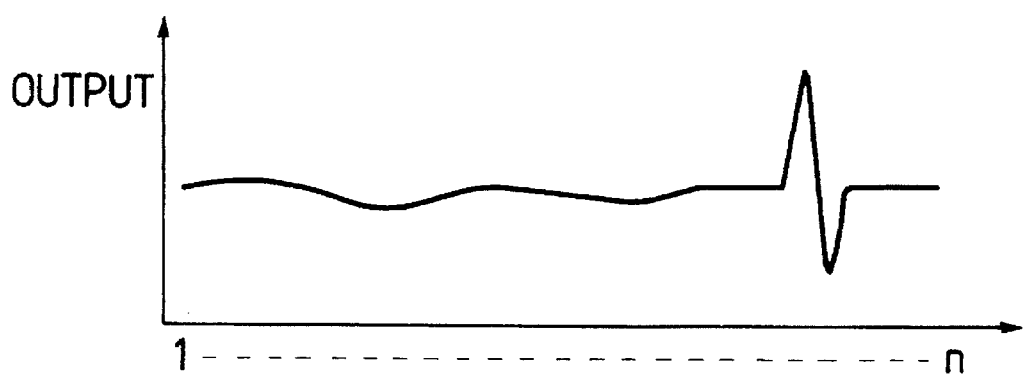
Figure 17:
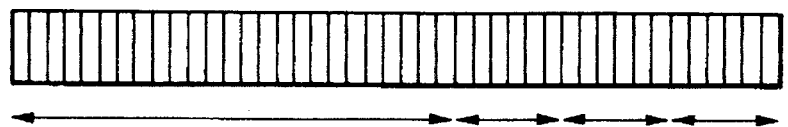
FIG. 17 illustrates how the block division is implemented for a case wherein both types of subject are combined.

The embodiments discussed above involve a method in which either the small-block mode or the large-block mode is selected. According to the method, if there is a mixture of low-frequency and high-frequency patterns in focus detection area, then the existence of the high-frequency component causes the P–P value to exceed the specified Cth, leading to the small-block mode selected. This means that the focus detection can be conducted on a subject with the high-frequency pattern, while it cannot be conducted on a subject with the low-frequency pattern. As a result, the objective lens will focus on the subject with the high-frequency pattern. Therefore, if the subject with the low-frequency pattern is the one that the photographer intends to take a picture of, then the lens may focus at the subject that the photographer does not intend to focus at. To eliminate such possibility, the system may be designed to implement the focus detecting calculation so that it selects the narrow block mode for a sensor position where there are considerable contrast variations in the filtered data (FIG. 16B) obtained from the equation (1), while it selects the wide block mode for a sensor position where there are less contrast variations (FIG. 17). Thus the system executes the focus detecting calculation separately for each of the blocks when a focus detection area has a mixture of low-frequency and high-frequency patterns as shown in FIG. 16A.

Also, if a contrast edge of a subject pattern is located on the boundary between the blocks, inconsistent calculation results may be given. This problem can be avoided by using the method disclosed by the present applicant under Japanese patent laid-open application No. 2-135311. In this method, the block boundary is shifted in accordance with the contrast of the output of the image sensor arrays near the block boundary.

Further, the present invention can be used not only for the focus detecting apparatus incorporating the one-dimensional image sensor array in the embodiments discussed, but also for the focus detection based on a two-dimensional sensor with sensor pixels arranged in the two-dimensional mode.

We claim:

1. In a focus detecting apparatus, comprising:
   a focus detecting optical system which leads two images created by light passing through two different points of an objective lens onto a pair of one-dimensional image sensor arrays;
   a dividing means for dividing said pair of image sensor arrays into small blocks to take out an image output from each block;
   a focus detection calculating means for relatively shifting the image outputs obtained from said pair of image sensor arrays to calculate a relative shift amount of said two images; and
   modifying means for changing the width of said blocks; said focus detecting apparatus comprising deciding means which analyzes space frequency components of a subject, and which decreases the width of said blocks through said modifying means when it determines that said subject includes a high-frequency component, or increases the width of said blocks when it determines that said subject includes a low-frequency component.

2. The focus detecting apparatus according to claim 1, wherein two-dimensional image sensor arrays are used in place of said one-dimensional image sensor arrays.

3. The focus detecting apparatus according to claim 1, which comprises 2 decider that judges whether or not there are reliable relative shift amounts among the relative shift amounts of two images calculated by said focus detection calculating means, and selecting means that selects a relative amount satisfying a certain requirement from the relative shift amounts that have been judged to be reliable, and which drives the objective lens to a focusing position in accordance with the relative shift amount selected by said selecting means.

4. The focus detecting apparatus according to claim 1, wherein when said deciding means determines that there is a mixture of a low-frequency pattern section and a high-frequency pattern section in a focus detection area, it increases the width of said blocks in the low-frequency pattern section or decreases the width of said blocks in the high-frequency pattern section, in order to perform a focus detecting calculation for each block.

5. In a focus detecting apparatus, comprising:
   a focus detecting optical system which has a pair of one-dimensional image sensor arrays and leads two images, which have a parallax with reference to a subject, onto the pair of image sensor arrays,
   a dividing means for dividing said pair of image sensor arrays into small blocks to take out an image output from each block;
   a focus detection calculating means for relatively shifting the image outputs obtained from said pair of image sensor arrays to calculate a relative shift amount of said two images; and
   a modifying means for changing the width of said blocks; said focus detecting apparatus comprising a deciding means which analyzes space frequency components of a subject, and which decreases the width of said blocks through said modifying means when it determines that said subject includes a high-frequency component, or increases the width of said blocks when it determines that said subject includes a low-frequency component.

6. The focus detecting apparatus according to claim 5, which uses two-dimensional image sensor arrays in place of said one-dimensional image sensor arrays.

7. The focus detecting apparatus according to claim 5, which comprises a decider that judges whether or not there are reliable relative shift amounts among the relative shift amounts of two images calculated by said focus detection calculating means, and a selecting means that selects a relative amount satisfying a certain requirement from the relative shift amounts that have been judged to be reliable, and which drives the objective lens to a focusing position in accordance with the relative shift amount selected by said selecting means.

8. The focus detecting apparatus according to claim 5, wherein when said deciding means determines that there is a mixture of a low-frequency pattern section and a high-frequency pattern section in a focus detection area, it increases the width of said blocks in the low-frequency pattern section or decreases the width of said blocks in the high-frequency pattern section, in order to perform a focus detecting calculation for each block.

9. In a focus detecting apparatus, comprising:
   a focus detecting optical system which leads two images created by light passing through two different points of an objective lens onto a pair of one-dimensional image sensor arrays;
   a dividing means for dividing said pair of image sensor arrays into small blocks to take out an image output from each block;
   a focus detection calculating means for relatively shifting the image outputs obtained from said pair of image sensor arrays to calculate the relative shift amount of said two images; and
   modifying means for changing the width of said blocks;
   said focus detecting apparatus comprising a deciding means which analyzes space frequency components of a subject, and which decreases the width of said blocks through said modifying means when it determines that said subject includes a high-frequency component, or increases the width of said blocks when it determines that said subject does not include a high-frequency component.

10. In a focus detecting apparatus, comprising:
    a focus detecting optical system which has a pair of one-dimensional image sensor arrays and leads two images, which have a parallax with reference to a subject, onto the pair of image sensor arrays,
    a dividing means for dividing said pair of image sensor arrays into small blocks to take out an image output from each block;
    a focus detection calculating means for relatively shifting the image outputs obtained from said pair of image sensor arrays to calculate a relative shift amount of said two images; and a modifying means for changing the width of said blocks;
said focus detecting apparatus comprising a deciding means which analyzes space frequency components of a subject, and which decreases the width of said blocks through said modifying means when it determines that said subject includes a high-frequency component, or increases the width of said blocks when it determines that said subject does not include a high-frequency component.

11. In a focus detecting apparatus, comprising:

a focus detecting optical system which leads two images created by light passing through two different points of an objective lens onto a pair of one-dimensional image sensor arrays;

a dividing means for dividing said pair of image sensor arrays into small blocks to take out an image output from each block;

a focus detection calculating means for relatively shifting the image outputs obtained from said pair of image sensor arrays to calculate the relative shift amount of said two images; and modifying means for changing the width of said blocks;

said focus detecting apparatus comprising a deciding means which identifies a pattern of a subject, and which decreases the width of said blocks through said modifying means when it determines that said subject has a strong contrast, or increases the width of said blocks when it determines that said subject does not have a strong contrast.

12. In a focus detecting apparatus, comprising:

a focus detecting optical system which has a pair of one-dimensional image sensor arrays and leads two images, which have a parallax with reference to a subject, onto the pair of image sensor arrays;

a dividing means for dividing said pair of image sensor arrays into small blocks to take out an image output from each block;

a focus detection calculating means for relatively shifting the image outputs obtained from said pair of image sensor arrays to calculate a relative shift amount of said two images; and a modifying means for changing the width of said blocks;

said focus detecting apparatus comprising a deciding means which identifies a pattern of a subject, and which decreases the width of said blocks through said modifying means when it determines that said subject has a strong contrast, or increases the width of said blocks when it determines that said subject does not have a strong contrast.

13. In a focus detecting apparatus comprising:

a phototaking lens;

an image sensor comprising a plurality of photoelectric conversion elements;

an optical system for guiding an image of a subject to said image sensor;

a dividing means for dividing said image sensor into small blocks to take out an image output from each block;

focus state calculating means for detecting a focus state of said phototaking lens in each of said blocks; and a modifying means for changing the width of said blocks;

said focus detecting apparatus comprising deciding means which identifies a pattern of said subject, and which decreases the width of said blocks through said modifying means when it determines that said subject has a strong contrast, or increases the width of said blocks when it determines that said subject does not have a strong contrast.

14. In a focus detecting apparatus, comprising:

a focus detecting optical system which leads two images created by light passing through two different points of an objective lens onto a pair of one-dimensional image sensor arrays;

a dividing means for dividing said pair of image sensor arrays into small blocks to take out an image output from each block;

a focus detection calculating means for relatively shifting the image outputs obtained from said pair of image sensor arrays to calculate the relative shift amount of said two images; and modifying means for changing the width of said blocks;

said focus detecting apparatus comprising a deciding means which analyzes space frequency components of a subject, and which decreases the width of said blocks through said modifying means when it determines that said subject includes a high frequency component, or increases the width of said blocks when it determines that said subject does not include a high-frequency component, and wherein when said deciding means determines that there is a mixture of a not-high-frequency pattern section and a high-frequency pattern section in a focus detection area, it increases the width of said blocks in the not-high-frequency pattern section, or decreases the width of said blocks in the high-frequency pattern section, in order to perform a focus detecting calculation for each block.

15. In a focus detecting apparatus, comprising:

a focus detecting optical system which has a pair of one-dimensional image sensor arrays and leads two images, which have a parallax with reference to a subject, onto the pair of image sensor arrays;

a dividing means for dividing said pair of image sensor arrays into small blocks to take out an image output from each block;

a focus detection calculating means for relatively shifting the image outputs obtained from said pair of image sensor arrays to calculate a relative shift amount of said two images; and a modifying means for changing the width of said blocks;

said focus detecting apparatus comprising a deciding means which analyzes space frequency components of a subject, and which decreases the width of said blocks through said modifying means when it determines that said subject includes a high-frequency component, or increases the width of said blocks when it determines that said subject does not include a high-frequency component, and wherein when said deciding means determines that there is a mixture of a not-high-frequency pattern section and a high-frequency pattern section in a focus detection area, it increases the width of said blocks in the not-high-frequency pattern section, or decreases the width of said blocks in the high-frequency pattern section, in order to perform a focus detecting calculation for each block.

16. In a focus detecting apparatus, comprising:

a focus detecting optical system which leads two images created by light passing through two different points of an objective lens onto a pair of one-dimensional image sensor arrays;

a dividing means for dividing said pair of image sensor arrays into small blocks to take out an image output from each block;

a focus detection calculating means for relatively shifting the image outputs obtained from said pair of image sensor arrays to calculate the relative shift amount of said two images; and modifying means for changing the width of said blocks;

said focus detecting apparatus comprising a deciding means which identifies a pattern of a subject, and which decreases the width of said blocks through said modifying means when it determines that said subject has a strong contrast, or increases the width of said blocks when it determines that said subject does not have a strong contrast, and wherein when said deciding means determines that there is a mixture of a not-strong-contrast pattern section and a strong-contrast pattern section in a focus detection area, it increases the width of said blocks in the not-strong-contrast pattern section, or decreases the width of said blocks in the strong-contrast pattern section, in order to perform a focus detecting calculation for each block.

17. In a focus detecting apparatus, comprising:

a focus detecting optical system which has a pair of one-dimensional image sensor arrays and leads two images, which have a parallax with reference to a subject, onto the pair of image sensor arrays;

a dividing means for dividing said pair of image sensor arrays into small blocks to take out an image output from each block;

a focus detection calculating means for relatively shifting the image outputs obtained from said pair of image sensor arrays to calculate a relative shift amount of said two images; and a modifying means for changing the width of said blocks;

said focus detecting apparatus comprising a deciding means which identifies a pattern of a subject, and which decreases the width of said blocks through said modifying means when it determines that said subject has a strong contrast, or increases the width of said blocks when it determines that said subject does not have a strong contrast, and wherein when said deciding means determines that there is a mixture of a not-strong-contrast pattern section and a strong-contrast pattern section in a focus detection area, it increases the width of said blocks in the not-strong-contrast pattern section, or decreases the width of said blocks in the strong-contrast pattern section, in order to perform a focus detecting calculation for each block.

18. In a focus detecting apparatus, comprising:

a phototaking lens;

an image sensor comprising a plurality of photoelectric conversion elements;

an optical system for guiding an image of a subject to said image sensor;

a dividing means for dividing said image sensor into small blocks to take out an image output from each block;

focus state calculating means for detecting a focus state of said phototaking lens in each of said blocks; and modifying means for changing the width of said blocks;

said focus detecting apparatus comprising deciding means which identifies a pattern of said subject, and which decreases the width of said blocks through said modifying means when it determines that said subject has a strong contrast, or increases the width of said blocks when it determines that said subject does not have a strong contrast, and wherein when said deciding means determines that there is a mixture of a not-strong-contrast pattern section and a strong-contrast pattern section in a focus detection area, it increases the width of said blocks in the not-strong-contrast pattern section, or decreases the width of said blocks in the strong-contrast pattern section, in order to perform a focus detecting calculation for each block.

19. In a focus detecting apparatus, comprising:

a focus detecting optical system which has a pair of one-dimensional image sensor arrays and leads two images, which have a parallax with reference to a subject, onto the pair of image sensor arrays;

a dividing device which divides said pair of image sensor arrays into small blocks to take out an image output from each block;

a focus detection calculating device which relatively shifts the image outputs obtained from said pair of image sensor arrays to calculate a relative shift amount of said two images; and a modifying device which changes the width of said blocks; said focus detecting apparatus comprising a deciding device which analyzes space frequency components of a subject, and which decreases the width of said blocks through said modifying device when it determines that said subject includes a high-frequency component, or increases the width of said blocks when it determines that said subject does not include a high-frequency component.

20. In a focus detecting apparatus, comprising:

a focus detecting optical system which has a pair of one-dimensional image sensor arrays and leads two images, which have a parallax with reference to a subject, onto the pair of image sensor arrays;

a dividing device which divides each pair of image sensor arrays into small blocks to take out an image output from each block;

a focus detection calculating device which relatively shifts the image outputs obtained from said pair of image sensor arrays to calculate a relative shift amount of said two images; and a modifying device which changes the width of said blocks;

said focus detecting apparatus comprising a deciding device which identifies a pattern of a subject, and which decreases the width of said blocks through said modifying device when it determines that said subject has a strong contrast, or increases the width of said blocks when it determines that said subject does not have a strong contrast.

21. In a focus detecting apparatus, comprising:

a phototaking lens;

an image sensor comprising a plurality of photoelectric conversion elements;

an optical system for guiding an image of a subject to said image sensor;

a dividing device which divides said image sensor into small blocks to take out an image output from each block;

a focus state calculating device which detects a focus state of said phototaking lens in each of said blocks; and a modifying device which changes the width of said blocks;

said focus detecting apparatus comprising a deciding device which identifies a pattern of said subject, and which decreases the width of said blocks through said modifying device when it determines that said subject has a strong contrast, or increases the width of said blocks when it determines that said subject does not have a strong contrast.

22. In a focus detecting apparatus, comprising:

a focus detecting optical system which has a pair of one-dimensional image sensor arrays and leads two images, which have a parallax with reference to a subject, onto the pair of image sensor arrays;

a dividing device which divides said pair of image sensor arrays into small blocks to take out an image output from each block;

a focus detection calculating device which relatively shifts the image outputs obtained from said pair of image sensor arrays to calculate a relative shift amount of said two images; and a modifying device which changes the width of said blocks;

said focus detecting apparatus comprising a deciding device which analyzes space frequency components of a subject, and which decreases the width of said blocks through said modifying device when it determines that said subject includes a high-frequency component, or increases the width of said blocks when it determines that said subject does not include a high-frequency component, and wherein when said deciding device determines that there is a mixture of a not-high-frequency pattern section and a high-frequency pattern section in a focus detection area, it increases the width of said blocks in the not-high-frequency pattern section, or decreases the width of said blocks in the high-frequency pattern section, in order to perform a focus detecting calculation for each block.

23. In a focus detecting apparatus, comprising:

a focus detecting optical system which has a pair of one-dimensional image sensor arrays and leads two images, which have a parallax with reference to a subject, onto the pair of image sensor arrays;

a dividing device which divides said pair of image sensor arrays into small blocks to take out an image output from each block;

a focus detection calculating device which relatively shifts the image outputs obtained from said pair of image sensor arrays to calculate a relative shift amount of said two images; and a modifying device which changes the width of said blocks;

said focus detecting apparatus comprising a deciding device which identifies a pattern of a subject, and which decreases the width of said blocks through said modifying device when it determines that said subject has a strong contrast, or increases the width of said blocks when it determines that said subject does not have a strong contrast, and wherein when said deciding device determines that there is a mixture of a not-strong-contrast pattern section and a strong-contrast pattern section in a focus detection area, it increases the width of said blocks in the not-strong-contrast pattern section, or decreases the width of said blocks in the strong-contrast pattern section, in order to perform a focus detecting calculation for each block.

24. In a focus detecting apparatus, comprising:

a phototaking lens;

an image sensor comprising a plurality of photoelectric conversion elements;

an optical system for guiding an image of a subject to said image sensor;

a dividing device which divides said image sensor into small blocks to take out an image output from each block;

a focus state calculating device which detects a focus state of said phototaking lens in each of said blocks; and a modifying device which changes the width of said blocks;

said focus detecting apparatus comprising a deciding device which identifies a pattern of said subject, and which decreases the width of said blocks through said modifying device when it determines that said subject has a strong contrast, or increases the width of said blocks when it determines that said subject does not have a strong contrast, and wherein when said deciding device determines that there is a mixture of a not-strong-contrast pattern section and a strong-contrast pattern section in a focus detection area, it increases the width of said blocks in the not-strong-contrast pattern section, or decreases the width of said blocks in the strong-contrast pattern section, in order to perform a focus detecting calculation for each block.

* * * * *